United States Patent [19]

Timm

[11] Patent Number: 5,098,135
[45] Date of Patent: Mar. 24, 1992

[54] ROTARY JOINT WITH AXIAL COMPENSATION

[75] Inventor: Gerald L. Timm, Schoolcraft, Mich.

[73] Assignee: The Johnson Corporation, Three Rivers, Mich.

[21] Appl. No.: 625,415

[22] Filed: Dec. 11, 1990

[51] Int. Cl.[5] ............................................. F16L 39/04
[52] U.S. Cl. ........................................ 285/134; 165/89; 285/281
[58] Field of Search ................... 165/89; 285/134, 281

[56] References Cited

U.S. PATENT DOCUMENTS

| | | | |
|---|---|---|---|
| 2,805,086 | 9/1957 | Shumaker | 285/134 |
| 3,484,853 | 12/1969 | Nishi | 285/134 X |
| 4,262,940 | 4/1981 | Wiedenbeck et al. | 285/269 |
| 4,606,560 | 8/1986 | McCracken | 285/93 |
| 4,606,561 | 8/1986 | Jackson | 285/134 |
| 4,758,026 | 7/1988 | Timm | 285/281 |
| 4,792,164 | 12/1988 | Suemitsu | 285/134 |

FOREIGN PATENT DOCUMENTS

| | | | |
|---|---|---|---|
| 341260 | 1/1931 | United Kingdom | 285/134 |
| 638078 | 5/1950 | United Kingdom | 285/134 |

Primary Examiner—Allen J. Flanigan
Attorney, Agent, or Firm—Beaman & Beaman

[57] ABSTRACT

A rotary joint for introducing or removing a heat exchanging medium, such as steam, from a rotary dryer drum characterized by its ability to accommodate significant axial expansion or contraction with respect to the axis of drum rotation. A rod supported housing includes an axially displaceable nipple having an end engaging an annular seal ring associated with a drum journal mounted wear plate. Axial movement between the wear plate and joint housing is accommodated by relative movement between the housing and nipple, and preferably, springs axially bias the nipple into engagement with a self-aligning seal ring to maintain a fluid tight connection under all thermal and pressure conditions.

12 Claims, 1 Drawing Sheet

ROTARY JOINT WITH AXIAL COMPENSATION

BACKGROUND OF THE INVENTION

Rotary heat exchanging drums are widely used in the paper, fabric and web making industries. A plurality of heat exchanging drums sequentially contact the web engaging the drum's periphery to transfer heat between the drum and web. In many instances, steam is introduced into the drums through a rotary joint and condenses upon the drum shell inner wall and the condensate is removed through the same or another rotary joint. In some web forming operations cool water may be introduced into the drum to cool the web being processed.

A heat exchanging drum will be subjected to a wide range of temperatures. During start up the drum may be cold, i.e. at room temperature. Pressurized steam is introduced into the drum through the rotary joint, and it is important that the seals of the rotary joint be effective under all temperature conditions to provide a fluid tight seal regardless of the temperature of the joint or drum. Due to the thermal expansion and contraction of the drum, which may be significant, the axial dimension of the drum, and its associated supporting shafts and journals, will significantly vary under the different temperatures to which the drum is exposed. As the rotary joint is mounted at the end of the drum journal the axial dimensional variation of the drum journal often negatively affects the effectiveness of the rotary joint seals as the joint seals often utilize axial forces and pressures to produce sealing. Hence, under "cold" conditions the rotary joint seal surfaces may not be as effective as under "hot" operating conditions unless thermal compensating constructions are utilized, and under hot operating conditions axial expansion may produce excessive seal pressures.

While it is known to design rotary joints for drum type heat exchangers having thermal seal compensating features, known thermal compensating designs are relatively limited in the degree of axial compensation that may be accommodated, and a need exists for a rotary joint capable of effectively functioning under a wide range of thermal conditions.

It is an object of the invention to provide a rotary joint for use with rotary drum type heat exchangers which is capable of accommodating large axial dimensional variations due to thermal expansion and contraction.

Another object of the invention is to provide a rotary joint for rotary heat exchangers wherein a combination of axial and radial seals are utilized to provide effective fluid tight sealing under a wide range of temperatures.

An additional object of the invention is to provide a rotary joint capable of accommodating significant axial dimensional variations which is self-aligning with respect to the heat exchanger drum axis of rotation and is capable of maintaining a fluid tight connection even though eccentricities exist between the axes of the rotating heat exchanging drum and the rotary joint housing.

Yet another object of the invention is to provide a rotary joint capable of effectively operating under a wide range of thermal conditions and the joint sealing structure remains effective throughout the operating range of the joint.

In the practice of the invention a mounting flange is concentrically mounted upon the end of the journal of a rotating heat exchanger drum or the like. A wear plate is, in turn, mounted upon the flange, and the wear plate includes a seal surface concentric with the central passage which extends through the wear plate and the mounting flange.

The rotary joint housing is supported upon rods in a conventional manner, and the housing includes a cylindrical chamber substantially coaxially related to the axis of drum rotation. A generally cylindrical nipple is axially displaceable within the housing chamber and an end cap mounted upon an end of the housing includes seals which interconnect the housing and nipple in a fluid tight manner, yet permit the nipple to be axially displaced with respect to the housing and chamber.

The exterior end of the nipple abuts against an annular seal ring which engages the wear plate seal surface, and keying means interposed between the housing end cap and nipple cause the nipple to be rotatably fixed with respect to the housing.

In the disclosed embodiment a single fitting is mounted upon the housing in communication with the chamber to permit a heat exchanging medium to be introduced into the chamber, or removed therefrom, and the axially moveable relationship between the housing and nipple permits extensive axial displacement between the nipple and housing to occur without adversely affecting the efficiency of the rotary joint seals.

Preferably, a plurality of compression springs interposed between the housing and nipple bias the nipple toward the wear plate and seal ring to insure engagement between the nipple, seal ring and wear plate under all conditions.

The components of a rotary joint in accord with the invention are relatively simple in configuration permitting economical construction and assembly, and a rotary joint constructed in accord with the inventive concepts may be installed by those having average skill in the art.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
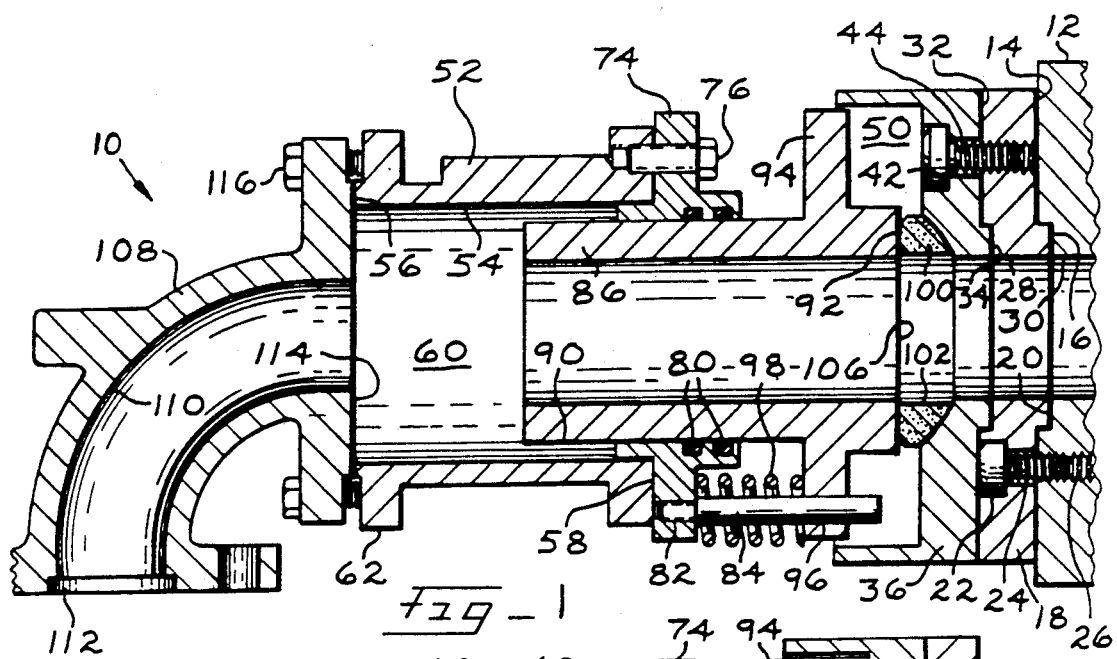
FIG. 1 is a diametrical elevational view of a rotary joint in accord with the invention, the nipple being shown in an extended relationship with respect to the housing.

A rotary joint in accord with the invention is generally indicated at 10, and the joint 10 is associated with the end of a rotary drum journal 12. The journal 12 constitutes a shaft supporting a heat exchanging drum such as commonly used in paper mills, not shown, and the journal includes a radial flat end face 14 which is countersunk at 16 concentric to the journal axis of rotation.

A flange 18 is of a generally flat configuration and includes a cylindrical axial extension 20 which is received within the journal countersink 16. Five bolt recesses and holes 22 are circumferentially spaced about the axis of the flange 18 and bolts 24 received within holes 22 firmly mount the flange 18 upon the end of the journal 12 in a concentric manner by means of the journal threaded holes 26 receiving the bolts 24.

The flange 18 includes a central bore 28 coaxially aligned and communicating with the drum journal bore 30, FIG. 1. Also, the flange 18 includes an outer radial face 32 which is concentrically countersunk at 34.

A wear plate 36 is mounted against the flange face 32 and includes a coaxial bore 38 communicating with bores 28 and 30, and the wear plate includes a cylindrical extension 40 closely received within the flange countersink 34. A plurality of countersunk bolt holes 42 are defined in the wear plate for receiving the bolts 44 which are threadedly received within threaded holes 45 formed in the flange 18, and in this manner the wear plate 36 is firmly connected to the flange 18 in a concentric manner.

The wear plate 36 includes a seal surface 46 concentric to the bore 38, and adjacent thereto. The seal surface 46 constitutes a concave spherical segment surface for cooperation with a complementary seal ring surface as later described.

The wear plate also includes an annular axially extending skirt 48 which defines an annular recess 50.

The rotary joint housing is indicated at 52 and is of a generally cylindrical configuration having an internal cylindrical bore 54, a radial flat outer end 56 and a radial flat inner end 58. The bore 54, intermediate the housing ends, defines a cylindrical chamber 60.

Figure 4:
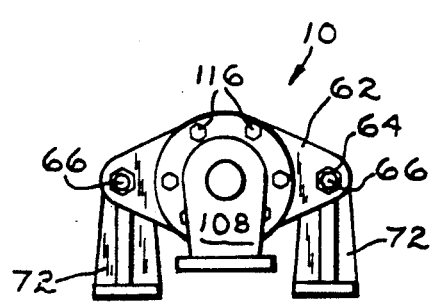
FIG. 4 is a reduced scale elevational end view as taken from the left of FIG. 3.

The housing 52 includes radially extending yokes 62 having axial holes 64 defined adjacent the yoke ends for slidably receiving the support rods 66. At their outer ends, the rods 66 are threaded for receiving the adjustable mounting nuts 68 and spacer 70, and the rods 66, at their inner ends, are supported upon brackets 72, FIG. 4, fixed upon stationary support structure located adjacent the drum journal. The rods 66, in association with the yokes 62, is of the conventional type often employed with rotary joints for drum type heat exchangers.

An annular end cap 74 is mounted upon the inner housing end 58 by a plurality of bolts 76 threaded into the housing. The end cap includes a cylindrical bore 78 and grooves defined in the end cap receive the elastomer O-rings 80 for establishing a sealed relationship with the nipple received within the end cap, as later described.

A plurality of axially extending threaded holes 82 are defined in the end cap and each receives a smooth walled cylindrical pin 84 which extends in an axial direction toward the wear plate 36.

A generally cylindrical nipple 86 is slidably received within the housing 52 and housing chamber 60. The nipple 86 includes an internal bore 88 extending therethrough, and the nipple exterior cylindrical surface 90 is closely received within the end cap bore 78 in an axially slidable manner. The seal rings 80 engage the nipple surface 90 in a fluid tight sealed manner.

Figure 2:
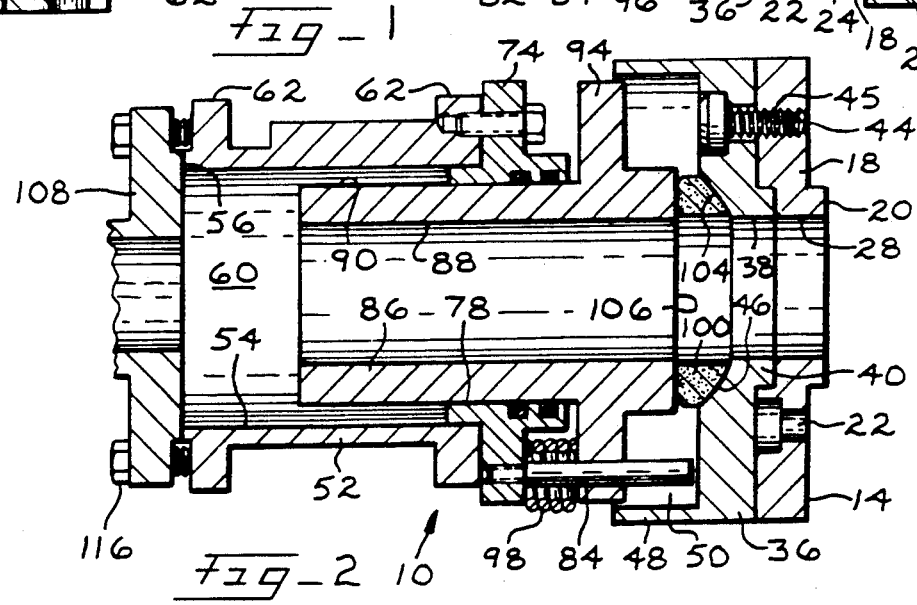
FIG. 2 is a partial diametrical sectional view similar to FIG. 1, illustrating the nipple being shown in a retracted relationship with respect to the housing.
Figure 3:
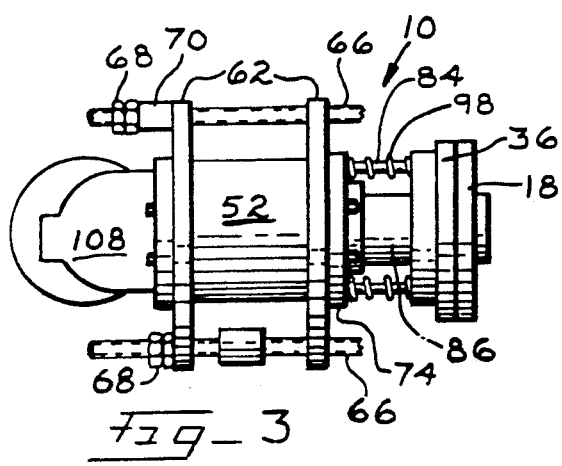
FIG. 3 is a reduced scale top plan view of a rotary joint in accord with the inventive concepts.

The exterior end of the nipple 86 constitutes a flat radial face 92, and a radially extending shoulder 94 is defined upon the nipple of a diameter as to be readily received within the wear plate recess 50 as will be apparent from FIGS. 1 and 2.

The nipple shoulder 94 is provided with a plurality of smooth axial holes 96 for slidably receiving the pins 84, and each of the pins 84 is circumscribed by a compression spring 98 which is interposed between the end cap 74 and the nipple shoulder 94 biasing the nipple 86 toward the wear plate 36.

An annular seal ring 100 is interposed between the wear plate 36 and the nipple end 92. Preferably, the seal ring 100 is formed of a long wearing sealing material such as antimony, and the seal ring includes a cylindrical bore 102 coaxially aligned with the bores 28, 30, 38 and 88. The seal ring face 104 is of a convex spherical segment configuration complementary to the wear plate surface 46, and the seal ring face 106 is flat and radial for accomplishing a fluid tight sealed relationship with the nipple 86.

The fluid medium passing through the joint 10 communicates with the housing chamber 60 by means of the fitting 108 attached to the housing end 56. The fitting 108 includes a bore 110 communicating with the conduit connection 112 which may be in the form of a soldered connection, or may consist of threads for receiving a pipe, or may merely constitute a countersink whereby a conduit flange may be connected thereto, not shown. The fitting face 114 is attached to the housing face 56 by bolts 116, and it will be appreciated that the open end 56 of the housing 52 constitutes a port for the housing which communicates with the fitting 108 which, in effect, closes the end of the housing chamber 60.

In use, the rotary joint apparatus will be assembled as described above, and as illustrated in the drawings. The housing 52 will be axially adjusted relative to the end of the drum journal, and the flange 18, by means of the support rods 66 and the nuts 68. The adjustment will be generally similar to that shown in FIG. 1 wherein the nipple 86 will be partially received within the housing chamber 60, the springs 98 will be biasing the nipple end 92 into engagement with the seal ring face 106 and maintain the seal ring face 104 in a sealing relationship with the wear plate seal surface 46. The relationship shown in FIG. 1 may be considered a "cold" condition, and the introduction of a heat exchanging medium into housing 52 through fitting 108 will cause the pressurized medium to enter the nipple bore 88 and pass through the seal ring, wear plate, flange and drum journal bores into the heat exchanger drum, not shown. Of course, the rotary joint of the invention may also be received to remove condensate from the heat exchanger drum, and under such conditions the operation of the joint is identical as when functioning as a steam supply joint, for instance.

As the heat exchanger drum heats, and axially expands, the drum journal end 14 will move to the left, FIG. 2, axially displacing the flange 18, wear plate 36, seal ring 100 and nipple 86. This expansion retracts the nipple 86 into the housing chamber 60 as illustrated in FIG. 2, compressing the springs 98, and the ends of the pins 84 will remain enclosed within the wear plate recess 50.

It will be appreciated that the above described rotary joint structure permits significant axial displacement between the drum journal and the rotary joint housing 52 without adversely affecting the fluid tight sealed relationship therebetween. The relative rotation between the rotary joint and the drum journal occurs at seal ring 100, and the fact that surfaces 46 and 104 are of a spherical segment configuration permits the seal ring to be self-aligning with respect to any eccentricities that may exist between the journal axis of rotation and the axis of the rotary joint. This self-aligning feature of the seal ring 100 is effective at all relative axial positions between the nipple 86 and the housing 52.

The use of the springs 98 assures that the nipple will always be engaging the seal ring 100. However, it is to be appreciated that, under most conditions, an internal pressure exists within the housing chamber 60 which will tend to bias the nipple toward the seal ring 100, and the primary purpose of the springs 98 is to assure a fluid tight relationship between the nipple, seal ring and wear plate under cold or low pressure conditions.

It is appreciated that various modifications to the inventive concepts may be apparent to those skilled in the art without departing from the spirit and scope of the invention.

I claim:

1. A rotary joint for a rotating drum having a journal having an axis of rotation characterized by its ability to accommodate axial expansion comprising, in combination, an annular mounting flange having an axis and a central passage, fastening means defined on said flange for coaxially attaching said flange to the drum journal, an annular wear plate having a central passage having an axis coaxially mounted on said flange, a seal surface defined on said wear plate concentric to said plate axis, an elongated housing having an internal chamber having a longitudinal axis, said housing having a port for communicating with a fluid conduit fitting, support means supporting said housing substantially coaxial with the journal axis of rotation, a cylindrical nipple partially within said housing chamber having a longitudinal axis coaxial with said chamber axis, said nipple being axially displaceable within said chamber, annular first sealing means interposed between said nipple and said housing whereby said nipple is sealed with respect to said housing at all axial nipple positions within said chamber, and second sealing means interposed between said nipple and said wear plate.

2. In a rotary joint as in claim 1, said second sealing means comprising a self-aligning seal.

3. In a rotary joint as in claim 1, said housing port comprising an end of said chamber, and a fluid conduit fitting attached to said housing at said chamber end enclosing said chamber end.

4. In a rotary joint as in claim 1, keying means interposed between said housing and said nipple preventing relative rotation between said housing and nipple about said chamber and nipple axis.

5. In a rotary joint as in claim 1, spring means interposed between said housing and said nipple axially biasing said nipple and said second sealing means toward said wear plate.

6. In a rotary joint as in claim 1, said housing having a first end disposed toward said wear plate, an annular end cap mounted upon said housing first end, said first sealing means being mounted on said end cap.

7. In a rotary joint as in claim 6, keying means mounted upon said end cap operatively associated with said nipple preventing relative rotation between said housing and said nipple.

8. In a rotary joint as in claim 7, said keying means comprising a plurality of axially extending pins mounted on said end cap, a radially extending shoulder defined on said nipple intermediate said end cap and said wear plate, and a plurality of axially extending holes defined in said shoulder, each hole slidably receiving a pin.

9. In a rotary joint as in claim 8, a compression spring encompassing at least some of said pins, said springs being interposed between said end cap and said nipple shoulder biasing said nipple toward said second sealing means.

10. In a rotary joint as in claim 1, said nipple having a radial end disposed toward said wear plate, said second sealing means comprising an annular seal ring having a first axial end engaging said nipple end and a second axial end engaging said wear plate seal surface.

11. In a rotary joint as in claim 10, said seal ring second end being of a convex spherical segment configuration, and said wear plate seal surface being of a complementary concave spherical segment configuration whereby said seal ring comprises a self-aligning interconnection between said wear plate and said nipple.

12. In a rotary joint as in claim 11, springs interposed between said housing and said nipple biasing said nipple into engagement with said seal ring and said seal ring into engagement with said wear plate seal surface.

* * * * *